S. L. ALLEN.
Improvement in Animal-Traps.
No. 129,203.    Patented July 16, 1872.
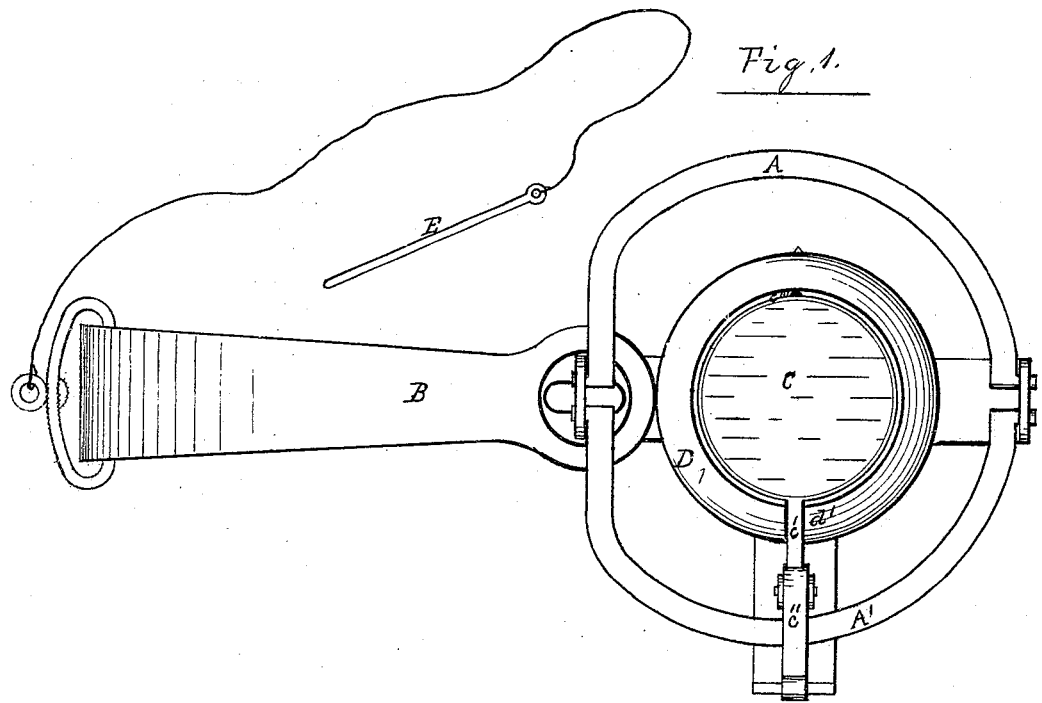
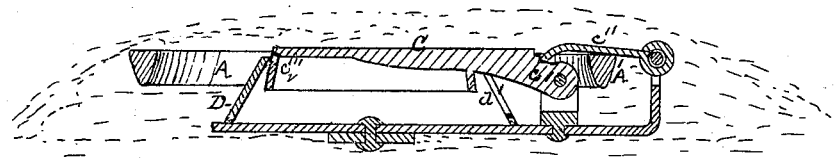
WITNESSES:
Benj Morison
Wm H. Morison
INVENTOR:
Samuel L. Allen.

UNITED STATES PATENT OFFICE.

SAMUEL L. ALLEN, OF CINNAMINSON, NEW JERSEY.

IMPROVEMENT IN ANIMAL-TRAPS.

Specification forming part of Letters Patent No. 129,203, dated July 16, 1872.

Specification describing certain Improvements in Animal-Traps, invented by SAMUEL L. ALLEN, of Cinnaminson, in the county of Burlington and State of New Jersey.

My invention relates to the construction, arrangement, and combination of a guard or fender around the treadle of an animal-trap in such a manner as to protect the treadle from any obstruction to its required free and easy or delicate movement when the trap is covered by a layer of earth or other suitable covering, or buried in the ground; the object of my invention being to allow the trap to be sufficiently covered or buried to prevent the animal from either seeing or smelling it, and at the same time to render certain the free downward movement of the treadle and consequent springing of the trap under all circumstances of its concealment or exposure to the weather.

Figure 1 is a plan view of a common portable trap, as "set," embodying my invention. Fig. 2 is a vertical transverse section through the center of the treadle, as represented in Fig. 1.

A and A' are the jaws of the trap; B, the operating spring; C, the treadle; and D, the guard or fender. The guard or fender D in this case, consists of a short hollow frustum of a cone, made of sheet metal, fastened or otherwise secured, so as to be concentric with the treadle C, and of a height a little less than the height of the treadle when the latter is in the horizontal or "set" position, and of such a diameter or width at its upper end as will leave a narrow clear space around between the treadle and the said surrounding upper edge of the guard D. A transverse slot, $d'$, in the guard D allows the arm $c'$ of the treadle to move up and down freely; and the treadle is held in its horizontal or "set" position by the usual latch $c''$ when the latter is pressed upward by the jaw A', acted upon by the spring B in the usual well-known manner. The treadle C has an outward flaring flange, $c'''$, projecting downward from its edge a short distance, so as to assist in preventing any loose portions of the covering earth or other covering from falling under the treadle while the trap is "set" or being buried or concealed.

The trap may, when "set," be placed in open view of the animal when the latter is intended to be attracted by the smell or sight of the bait; but when intended to be concealed from sight or smell by burying, (bait not being required,) a small pin, E, is provided, to be inserted in a small hole, $d$, in the flange $c'''$ of the treadle, so as to rest upon the upper edge of the guard D after the trap has been "set," and thus prevent the treadle from being pressed downward and the jaws sprung while burying or covering the trap with earth or other covering. After the burying or concealment has been completed the pin E must be gently withdrawn.

It will be understood without further description that the guard or fender D will effectually prevent the superincumbent earth or other loose covering for concealing the trap, from falling down beneath the treadle and preventing its free descent, and consequently the springing of the trap; and at the same time that it will allow the treadle to fall without any hindrance or obstruction from the guard D, because any downward movement of the treadle will necessarily increase the space between them.

The guard or fender D and the flange $c'''$ of the treadle C may be made either vertical or flared; but as the dirt which will fall between the guard and treadle in burying the trap, if the flange and guard were made vertical, would interfere with the free motion downward of the treadle after the trap is set, the flared form of the guard, before described, especially is to be preferred.

I claim as my invention—

1. A guard or fender, D, surrounding the treadle C, when constructed and arranged to operate in combination with the said treadle, substantially as and for the purpose hereinbefore set forth.

2. In combination, with the treadle C, of an animal-trap, I claim the flange $c'''$, substantially as and for the purpose hereinbefore set forth.

SAMUEL L. ALLEN.

Witnesses:
BENJ. MORISON,
WM. H. MORISON.